United States Patent [19]

Shazer, Jr. et al.

[11] Patent Number: 5,093,137
[45] Date of Patent: Mar. 3, 1992

[54] REDUCED CALORIE FROZEN DAIRY DESSERTS AND PROCESSES FOR PRODUCING THEM

[76] Inventors: William H. Shazer, Jr., 1764 Highland Blvd., Hoffman Estates, Ill. 60195; Susanne E. Keller, 155 Pebble Creek Dr., Lake Zurich, Ill. 60047

[21] Appl. No.: 599,219

[22] Filed: Oct. 17, 1990

[51] Int. Cl.$^5$ .............................................. A23C 9/13
[52] U.S. Cl. ..................... 426/42; 426/101; 426/548; 426/583
[58] Field of Search ............ 426/580, 522, 34, 35, 426/42, 56, 101, 330.2, 334, 548, 573, 583

[56] References Cited

U.S. PATENT DOCUMENTS

| | | | |
|---|---|---|---|
| 2,738,279 | 3/1956 | Stimpson et al. | 426/34 |
| 2,826,502 | 3/1958 | Sfortunato | 99/54 |
| 4,333,953 | 6/1982 | Trzecieski | 426/34 |
| 4,333,954 | 6/1982 | Trzecieski | 426/41 |
| 4,609,554 | 9/1986 | Barua et al. | 426/583 |
| 4,956,186 | 9/1990 | Streiff et al. | 426/583 |

FOREIGN PATENT DOCUMENTS 0308091 3/1989 European Pat. Off. .
2076275 12/1981 United Kingdom .

OTHER PUBLICATIONS

Hoslinger, "Lactose-Modified Milk and Whey", Food Technology, pp. 35-40, Mar. 1978.
Albrecht et al., "'Sandiness' Defect in Ice Cream", The Ice Cream Review, pp. 22-23, 62-68, Dec. 1956.

*Primary Examiner*—Donald E. Czaja
*Assistant Examiner*—Helen Pratt
*Attorney, Agent, or Firm*—Andrew M. Solomon; Jeffrey M. Hoster

[57] ABSTRACT

A reduced calorie frozen dairy dessert or frozen yogurt produced by:
(a) heating a mix of milk ingredients and water to a sufficient temperature to promote the pasteurization of said ingredients;
(b) cooling said ingredients and treating said ingredients with an enzyme for a sufficient period of time to reduce any inherent milk polysaccharides to their monosaccharide components;
(c) heating and maintaining said ingredients at a temperature between about 70° C. to about 95° C. for between about 5 minutes and about 60 minutes;
(d) adding a high potency sweetener and flavors to said mixture; and
(e) freezing said mixture;
said frozen dairy dessert not including any added sugars or bulking agents is provided. The dairy dessert is low in calories and has a superior texture.

20 Claims, No Drawings

REDUCED CALORIE FROZEN DAIRY DESSERTS AND PROCESSES FOR PRODUCING THEM

BACKGROUND OF THE INVENTION

In this diet conscious society, the regretful and painful abstinence from sweets and high calorie foods is necessary if one wishes to be fit and trim. Ice cream and other frozen novelty desserts often ranks high on the list of no-nos and must be foresworn much to the dismay of many sweet tooths. Whereas aspartame has become a very popular dietary sweetener in low-calorie soft drinks and other beverages (Schlatter et al. U.S. Pat. No. 3,492,131), the realization of a truly satisfactory low-calorie frozen dessert has not yet, until now, been achieved.

The problem in this area is that when sugar is removed from most if not all foodstuffs in an effort to reduce the caloric content, more than just sweet taste is noticeably removed. Sugar contributes to the mouthfeel of a particular food product and provides bulk or structure. Therefore, removal of the sugar consequently removes much of sugar's bulk and thereby renders the texture or consistency of the food unsatisfactory. As a result, the mere removal and replacement of sugar with a high potency sweetener does not result in an appreciably satisfactory product since the sweetener lacks the bulk of sugar.

Understandably then, in order to produce a frozen dessert, yogurt or confection with no additional sugar added, a bulking agent must be added to the mix together with the high potency sweetener such as aspartame. The bulking agents currently available either add as many calories to the product as sucrose would were it not removed (as is in the case of the maltodextrins) and/or will have deleterious side effects such as diarrhea (as in the case of polydextrose and sorbitol).

If sugar is removed from a product, the bulking agent is required to be added in order to perform the functions (other than sweetness) of sucrose in order to obtain an acceptable product. If sugar is removed from a frozen dairy dessert in an effort to reduce calories for example, the absence of an added bulking agent will result in a dessert that is unacceptably hard and icy when frozen. Ice crystal formation from any unbound water becomes prevalent and the overall sensory perception is unpalatable. Ideally, the frozen dessert should maintain a relatively high degree of softness when serving, and should not require a large tempering time before serving to attain the desired soft state.

It is an object of the present invention to provide a method for the production of frozen dairy desserts and frozen yogurt wherein the sugar (sucrose and/or bulk contributing sweetener) has been completely removed without requiring any additional bulking agents. This is achieved through a process including the enzymatic treatment of the disaccharide sugars naturally present in milk (lactose) so as to reduce them to their monosaccharide components. More specifically, milk ingredients traditionally used in the manufacture of ice cream, ice milk and yogurt are treated with beta-galactosidase which cleaves lactose into glucose and galactose and are heated for extended periods of time to provide a superior texture. This not only results in an increase in the sweetness of the composition, but also surprisingly does not require the addition of bulking agents in order to maintain acceptable consistency, palatability and mouthfeel.

The use of an enzyme, particularly beta-galactosidase (lactase), in milk or milk based products, to reduce lactose to its constituents is well known in the art. The use of lactase to hydzolyze lactose to its monosaccharide constituents in milk and whey products, including frozen dessert applications is described by Holsinger, V., Applications of Lactose Modified Milk and Whey; Food Tech. 35 (1978). Trzecieski, U.S. Pat. No. 4,333,953 discloses the use of non-fat milk solids with lactase to produce a creamy ice milk.

U.S. Pat. No. 4,333,954, also to Trzecieski, also discloses a soft ice cream wherein lactase is added in order to reduce the ice crystallization problems of lactose in the ice cream. This is the familiar 'sandy texture' that results when 20–30% of the milk solid non-fat is replaced by demineralized whey powder. The sandiness defect has been recognized to be a direct function of the amount of lactose present in the ice cream which can be removed by the hydrolysis to its monosaccharide components by lactase. Albrecht, T., et al., Sandiness Defect in Ice Cream, Ice Cream Review 22 (1956). None of the prior art however, teaches the hydrolysis of lactose, without subsequently putting in a bulking agent such as sorbitol or dextrose to replace the volume once occupied by the sugar.

EP 0 308 091 to Greenberg et al discloses the production of low and non-fat frozen desserts. The desserts are characterized by having high levels of whey protein with specific casein to whey ratios and have a low amount of lactose initially present in the dairy mix (0–10 percent by weigh;). The reference further suggests that the specifically defined mixture used to form the dessert may be heated to between about 82°–85° C. for between about 20 and 30 minutes when heated in a batch mode and to about 102° C. for about 5 to 8 minutes when used in a continuous mode. The heating is performed to substantially denature the whey protein associated with the skim milk and the whey protein concentrate. The sweet properties of the frozen dessert are obtained by utilizing sucrose or the replacement of a portion of the sucrose with a high potency sweetening agent while maintaining approximately the same level of solids.

The existing prior art demonstrates that sugar (sucrose) or other carbohydrate sweeteners can be partially replaced in frozen desserts and confections by hydrolyzing lactose to form glucose and galactose. Addition of ingredients such as whey (high lactose) have been used as a partial replacement for sucrose; however no one has demonstrated the complete removal of sucrose and/or added carbohydrate sweeteners in a frozen dairy product which further has a desirable texture.

DEFINITION

The term "polysaccharide" defines both di- and polysaccharide compounds. More particularly, according to this invention lactose is defined to be a polysaccharide.

SUMMARY OF THE INVENTION

A method for the production of reduced calorie frozen desserts and yogurts is disclosed without the need for the addition of a bulking agent wherein the milk sugar lactose is hydrolyzed to its monosaccharide components, glucose and galactose, by treatment of the milk or milk products with beta-galactosidase. The process increases sweetness, creates a greater freezing point depression and inhibits ice crystal formation when the mix is incorporated in the final product. The surprising absence of the need for any additional bulking agents results in a truly reduced calorie dessert or yogurt.

More specifically, in accordance with a preferred embodiment, the present invention comprises a reduced calorie frozen dairy dessert produced by the process comprising the steps of:
(a) heating a mix of milk ingredients and water to a sufficient temperature to promote the pasteurization of said ingredients;
(b) cooling said ingredients and treating said ingredients with an enzyme for a sufficient period of time to reduce any inherent milk polysaccharides to their monosaccharide components;
(c) heating and maintaining said ingredients at a temperature between about 70° C. to about 95° C. for between about 5 minutes and about 60 minutes;
(d) adding a high potency sweetener and flavors to said mixture; and
(e) freezing said mixture;
said frozen dairy dessert not including any added sugars or bulking agents.

In the preferred embodiment, step (a) precedes step (b), but in alternative embodiments, step (b) can precede step (a).

In accordance with another embodiment, reduced calorie frozen yogurt is produced in accordance with steps (a)-(e) above with the primary difference being that the final product includes cultured yogurt which is added in any of steps (a)-(d).

By using the process according to the present invention, reduced calorie frozen dairy desserts and yogurts are produced wherein the lactose initially present in the dairy mix has been reduced to its monosaccharide components by treatment with beta-galactosidase and wherein the ingredients which are used to form the final product undergoes an extended heating step prior to freezing. This increases sweetness, reduces ice crystallization and by creating a greater freezing point depression thereby improves the texture of the product. There is no need to add further bulking agents to substitute for the missing sucrose and the addition of aspartame or other high potency sweeteners or flavorings may be added for taste without an increase in calories.

DETAILED DESCRIPTION OF THE INVENTION

When describing the preferred embodiment certain terminology will be utilized for the sake of clarity. Such terminology encompasses the recited embodiment, as well as all technical equivalents which operate in a similar manner for a similar purpose to achieve a similar result.

The method of the present invention yields frozen desserts with improved characteristics over that known in the art. Whereas the hydrolysis of the milk sugar lactose to its monosaccharide components glucose and galactose is not surprising or new, the complete removal of added bulk sweeteners without their replacement with a bulking agent has not hereinbefore been possible in combination with a heating step during product formulation and a high potency sweetener. The produced frozen dairy dessert or yogurt may be characterized as truly reduced calorie and can be enjoyed by two fairly substantial segments of today's population.

On the one hand, there are those that must restrict their caloric intake to maintain their weight at a manageable level. The reduced calorie dairy products of the present invention serve as a welcome respite to those on diets.

There are also those who are lactose intolerant, or by consuming sugar suffer effects such as flatulence, diarrhea, cramps, tissue dehydration and lack of calcium absorption. The ability to produce frozen dairy products which are lactose-free and do not include sugar or other bulking agents provides a solution to those who suffer from these problems.

The products of the present invention may be made from milk ingredients such as whole milk, skim milk, concentrated skim milk, evaporated skim milk or dairy whey. In normal milk, lactose comprises nearly 60% of the non-fat solids. Lactose also comprises 80-85% of the dairy whey solids and as is taught by the prior art, milk solids non-fat levels in frozen desserts should not exceed 13.3%. However, the levels of milk solids non-fat according to the present invention can range from about 13.3 to about 20% by weight of the final product.

Prior to treatment, the ingredients preferable contain at least 10 percent lactose by weight and more preferably between about 8 and about 15 percent by weight. Because the lactose initially present is broken down into its monosaccharide components, additional milk protein may be added to the initial mixture. As a result, a reduced calorie frozen dessert with higher levels of protein can be provided to the consumer.

Preferably, skim milk is first mixed with non-fat dry milk or condensed skim milk and water so that the milk solids non-fat is approximately 17%. The ingredients are then pasteurized and homogenized using conventional pasteurization and homogenization techniques (60°-90° C.) and (2000/500 p.s.i.) then cooled to approximately 38° C.

Enzyme treatment of the lactase may be conducted in one of two alternative procedures. Beta-galatoside, approximately 10,000 u/l (u=1 μg. glucose that is produced from treatment of 5% lactose at a pH 7.0, room temperature, in I minute) may be added to the mixture immediately which is then cooled to 5° C. for a period of 24 hours. The mix may also be cooled first in which case the enzyme is then added and allowed to hydrolyze the lactose for 48 hours. The cooler the environment of the substrate, the slower the activity of the enzyme. The enzyme treatment may be performed prior to or after pasteurization and homogenization.

Beta-galactosidase or lactase may be obtained commercially from any one of a number of sources. Pfizer, Inc. produces a food grade liquid lactase which is an extract from *Candida pseudotropicalis,* a lactase fermenting dairy yeast. The enzyme may either be added directly to the dairy mix at approximately 10,000 u/l or may be immobilized in a resin or gel matrix. If the lactase is added directly to the dairy mix, it would preferably be deactivated through further heating after the hydrolysis time. This can be accomplished by a second pasteurization step, preferably a high temperature, short time (HTST) application. The enzyme is preferably inactivated. Although it could be left in with no adverse effects on the mix, most commercial enzyme extracts may contain residues of other enzymes such as protease. These may then attack other dairy proteins resulting in their degradation which leads to an undesirable product.

If the enzyme is immobilized in a gel or resin the dairy mix may pass through the gel beads or resin in a column, through contact in a batch tank or by any one of the number of immobilized enzyme techniques known in the art. However, once a sufficient time for enzyme-substrate contact is allowed to take place the mix may then be cooled to approximately 0°–10° C.

Hydrolysis of lactose to glucose and galactose reduces the lactose content, thereby allowing for a greater amount of lactose that can be initially added to the milk ingredients prior to enzyme hydrolysis. Enzyme hydrolysis can therefore increase the sweetness of the mix. Since the number of saccharide molecules is increased due to hydrolysis and because the solubilities of glucose and galactose are higher than that of lactose, the freezing Point of the mix is reduced and the sandy texture of lactose crystallization is avoided.

After the pasteurization and hydrolysis of lactose steps have been completed, the ingredients are heated to between about 70° C. and about 95° C. for between about 5 minutes and about one hour. The purpose of this step is to improve the final texture of the frozen dessert. Without this heating step, the final product can suffer from ice crystallization and yield an unduly coarse product. By comparison, by utilizing the process of the present invention, the resulting product has an excellent texture when frozen.

Once the ingredients are sufficiently cooled after heating, they are used to produce frozen dairy desserts and yogurts. High potency sweeteners such as aspartame, alitame, acesulfame-K, saccharin, cyclamate etc. are added for sweetness without additional bulking agents. Flavors, fruits and other ingredients may be added as desired according to the formulation of the dessert or yogurt as known in the art. Stabilizers such as carageenan, xanthan gum, microcrystalline cellulose, locust bean gum and other stabilizer compounds known in the art may be added as desired. However, the use of stabilizers may not be as required as in prior uses as a result of the heating step of the inventive process.

Alternatively, the addition of sweeteners, flavors, stabilizers and the like can take place prior to the heat treatment step.

When producing frozen yogurt, cultured yogurt is added to the mixture at any time prior to freezing the mixture into a final product.

The milk solid portion of the dairy mix may be anywhere from 9.0–33.0% by weight of the overall product. Preferably, the milk solids comprise approximately 15–20% by weight of the final mix. Milk fat levels may be anywhere from 0–20% of the final dairy mix.

The mix may then be packaged in either single or multi-serving bulk packs and cooled to a desired consistency for consumption. Final freezing points can range from approximately −1.0° C. to −2.2° C., although the Preferred temperature at which the mix is frozen after enzyme hydrolysis of the lactose and addition of the desired sweeteners, flavor compounds and the like is −1.6° C. to −1.9° C.

The following examples are incorporated herein to better describe and more fully set forth the method for practicing the present invention. They are for illustrative purposes only and should not be construed as limiting the spirit and/or scope of the claims.

COMPARATIVE EXAMPLE 1

The following ingredients (by weight percentages) were mixed together and held at 5° C. for enzyme treatment:

18 percent Milk solids not fat (from condensed skim milk)

4 percent milk fat (from cream)
0.25 percent Star Blend (stabilizer)
0.5 percent NOVO lactase balance water After holding, the aspartame was added immediately and the mixture was processed in a typical industrial manner used to form frozen desserts, namely heating to 82° C. for 30 seconds, homogenizing the mixture in a two stage homogenizer (2000 lb/in$^2$ first stage, 500 lb/in$^2$ second stage) and cooling it to 4.5° C. Vanilla (0.5 parts) was added and the mixture was aged for 24 hours. After aging, the mixture was frozen by using a conventional continuous freezer and was hardened overnight at −29° C.

INVENTIVE EXAMPLE 1

The procedure of Comparative Example 1 was utilized to produce a frozen dairy dessert except that after enzyme treatment the mixture was heated and held at 85° C. for 30 minutes after which the aspartame was added and the mix was homogenized in a two stage homogenizer (2000 lb/in$^2$ first stage, 500 lb/in$^2$ second stage) and cooled to 4.5° C. The percent of lactose was 10 percent and the percent of solids was 20 percent.

QUALITATIVE TESTING

Samples of the frozen dairy desserts produced in Comparative Example 1 (control) and Inventive Example 1 (invention) were tested for the below listed properties by a sample size of 53 persons. The results are listed in the following table.

TABLE

| Property | Control | Invention |
| --- | --- | --- |
| overall liking | 5.7 | 6.1* |
| (9 = like extremely) | | |
| overall flavor | 5.9 | 6.2 |
| (9 = like extremely) | | |
| sweetness | 3.2 | 3.2 |
| (5 = much too strong) | | |
| overall texture | 4.7 | 5.6** |
| (9 = like extremely) | | |
| creaminess | 2.0 | 2.4** |
| (5 = much too creamy) | | |
| smoothness | 2.3 | 2.7** |
| (5 = extremely smooth) | | |

*The scores were significantly different at the 90% confidence level.
**The scores were significantly different at the 95% confidence level.

The conclusion is that the 30 minute heat treatment at 85° C. does produce a preferred texture in this product.

Having described the invention in detail and by reference to the preferred embodiment thereof, it will be apparent that modifications and variations are possible without departing from the scope of the appended claims.

What is claimed is:

1. A reduced calorie frozen dairy dessert produced by the process comprising the steps of:
   (a) heating a mix of milk ingredients and water to a sufficient temperature to promote the pasteurization of said ingredients;
   (b) cooling said ingredients and treating said ingredients with an enzyme for a sufficient period of time to reduce any inherent milk polysaccharides to their monosaccharide components;
   (c) heating and maintaining said ingredients at a temperature between about 70° C. to about 95° C. for between about 5 minutes and about 60 minutes;
   (d) adding a high potency sweetener and flavors to said mixture; and (e) freezing said mixture;
said frozen dairy dessert not including any added sugars or bulking agents.

2. The frozen dairy dessert according to claim 1 wherein said milk ingredients are selected from the group consisting of whole milk, skim milk, condensed skim milk and non-fat dry milk.

3. The frozen dairy dessert according to claim 2 wherein said pasteurization is carried out at approximately 60°-90° C.

4. The frozen dairy dessert according to claim 3 wherein said enzyme is added directly to said mixture of milk ingredients.

5. The frozen dairy dessert according to claim 3 wherein said enzyme is immobilized prior to its treatment of said milk ingredients.

6. The frozen dairy dessert according to claim 3 wherein said enzyme is beta-galactosidase.

7. The frozen dairy dessert according to claim 1 wherein said milk ingredients in step (a) include lactose in an amount greater than or equal to about 10 percent by weight of said milk ingredients and water.

8. The frozen dairy dessert according to claim 7 wherein said high potency artificial sweetener is selected from the group consisting of aspartame, alitame, saccharin, cyclamate, acesulfame-K, sucralose, and their salts and mixtures thereof.

9. The frozen dairy dessert according to claim 8 further comprising a stabilizer.

10. The frozen dairy dessert according to claim 9 wherein said stabilizer is selected from the group consisting of carageenan, locust bean gum, xanthan gum and microcrystalline cellulose.

11. A reduced calorie frozen yogurt produced by the process comprising the steps of:
 (a) heating a mix of milk ingredients and water to a sufficient temperature to promote the pasteurization of said ingredients;
 (b) cooling said ingredients and treating said ingredients with an enzyme for a sufficient period of time to reduce any inherent milk polysaccharides to their monosaccharide components;
 (c) heating and maintaining said ingredients at a temperature between about 70° C. to about 95° C. for between about 5 minutes and about 60 minutes;
 (d) adding a high potency sweetener and flavors to said mixture;
 (e) adding cultured yogurt to said mixture; and
 (f) freezing said mixture;
said yogurt not including any added sugars or bulking agents.

12. The frozen yogurt according to claim 11 wherein said milk ingredients are selected from the group consisting of whole milk, skim milk, condensed skim milk and non-fat dry milk.

13. The frozen yogurt according to claim 12 wherein said pasteurization is carried out at approximately 60°-90° C.

14. The frozen yogurt according to claim 13 wherein said enzyme is added directly to said mixture of milk ingredients.

15. The frozen yogurt according to claim 13 wherein said enzyme is immobilized prior to its treatment of said milk ingredients.

16. The frozen yogurt according to claim 13 wherein said enzyme is beta-galactosidase.

17. The frozen yogurt according to claim 11 wherein said milk ingredients in step (a) include lactose in an amount greater than or equal to about 10 percent by weight of said milk ingredients and water.

18. The frozen yogurt according to claim 17 wherein said high potency artificial sweetener is selected from the group consisting of aspartame, alitame, saccharin, cyclamate, acesulfame-K, sucralose, and their salts and mixtures thereof.

19. The frozen yogurt according to claim 18 further comprising a stabilizer.

20. The frozen yogurt according to claim 19 wherein said stabilizer is selected from the group consisting of carageenan, locust bean gum, xanthan gum and microcrystalline cellulose.

* * * * *